Oct. 27, 1970  G. L. MATTHAEI ET AL  3,537,040
LOW-PASS WAVEGUIDE FILTER
Filed Jan. 11, 1968  2 Sheets-Sheet 1
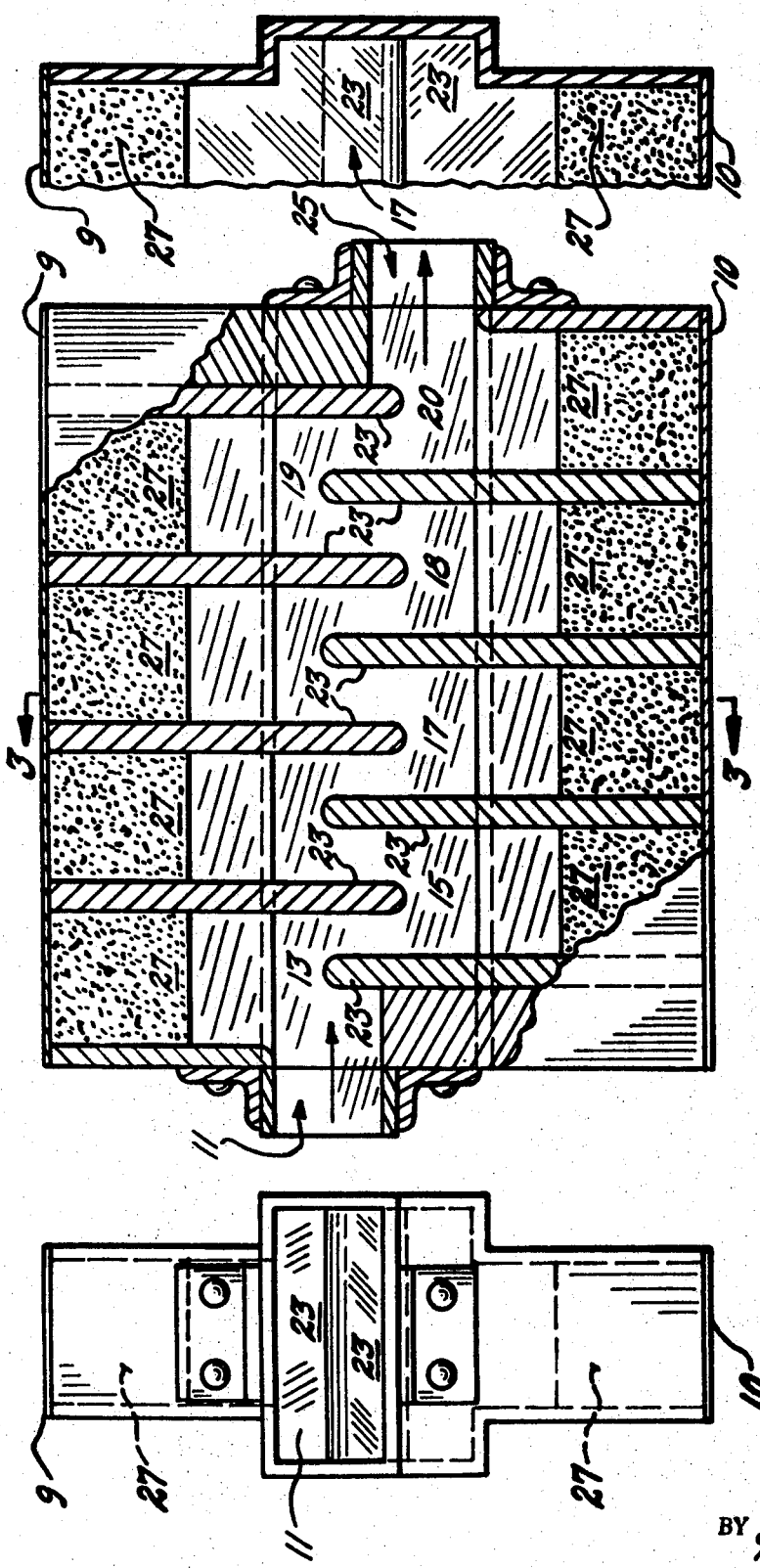

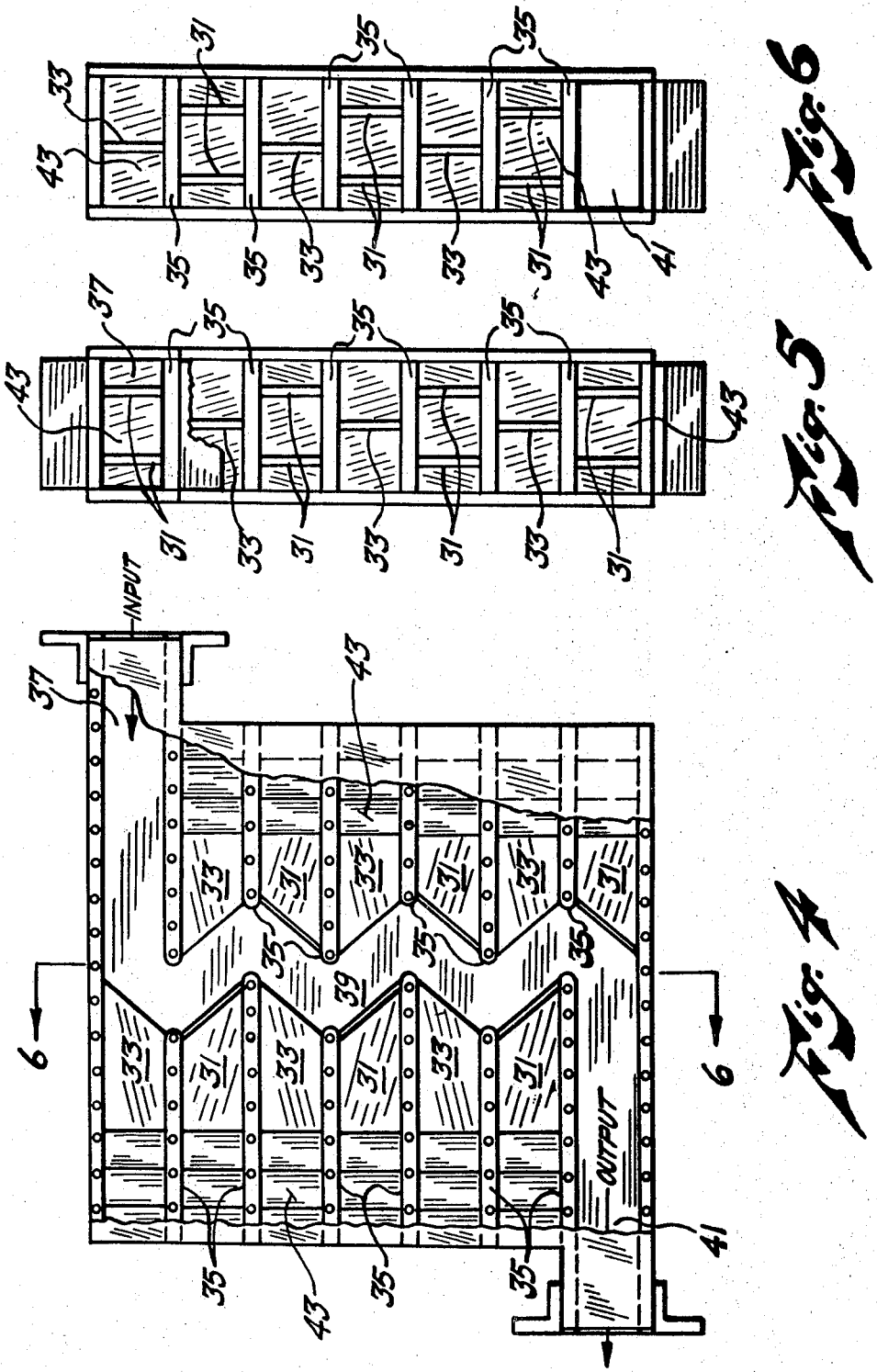

United States Patent Office 3,537,040
Patented Oct. 27, 1970

3,537,040
LOW-PASS WAVEGUIDE FILTER
George L. Matthaei, Santa Barbara, Leo Young, Palo Alto, and Bernard M. Schiffman, Menlo Park, Calif., assignors to the United States of America as represented by the Secretary of the Air Force
Filed Jan. 11, 1968, Ser. No. 697,152
Int. Cl. H03h 9/00
U.S. Cl. 333—73         2 Claims

ABSTRACT OF THE DISCLOSURE

Low-pass waveguide filter which the guiding structure zig-zags in the E-plane or H-plane. A waveguide is divided into alternating compartments forming channels with absorbing materials at the extremes of the channels and a zig-zag path is allowed for the passage of electromagnetic energy.

BACKGROUND OF THE INVENTION

This invention relates to low-pass filter and more particularly to a high power low-pass waveguide filter. In the past the most promising high-power low-pass filter structures have either been of the waffle-iron type or the leaky-wall type. Waffle-iron filters are of the reflecting type, and can give a large broad stop-band. However, at sufficiently high frequencies they will inevitably have additional pass-bands which are usually about 2.5 to 3 times the cutoff frequency for a single waffle structure. Leaky-wall filters are of the absorbing type and they attenuate by causing power to leak out of the side walls of the guide above given frequency. They too have stop-bands of limited extent because when the frequency becomes sufficiently high, so that the structure is large compared to the wavelength, the propagation becomes roughly like that of an antenna beam; much of the energy then tends to flow down the center of the guide as a beam of light would with relatively little energy coupling out the side walls to the absorptive materials. Also, for certain modes, there may be frequency bands where there is little attenuation at all because these particular modes do not happen to couple well to the particular side wall coupling slot configuration that is used.

SUMMARY OF THE INVENTION

The present invention is a novel low-pass filter structure that provides means of overcoming the disadvantages of the waffle-iron and leaky-wave filters. A high-power, low-pass filter can be constructed with a low-pass pass-band followed by a high attenuation stop band which may cover all frequencies above the pass-band. In the pass-band this filter operates as a low-pass reactive filter structure; in the stop-band the filter becomes extremely absorptive and especially so when the radiation tends to resemble a beam.

The present invention is a new type of leaky-wall waveguide filter in which the guiding structure zig-zags in the E-plane or the H-plane or any combination thereof and which by virtue of the absence of a direct optical path between input and output is free of spurious responses attributable thereto. Enhanced greater attenuation results from the reflection characteristics of the filter.

The filter structures shown in this invention are capable of handling high power. The separating plates in either embodiment to be presently explained that form the inner part of the structure can easily be made with rounded edges which helps to increase the power rating. Also, unlike the waffle-iron filter, the impedance level can be kept relatively high in this filter because the cut-off waveguides should provide a very effective means for achieving the series inductance values required for relatively high impedance level without harming the absorptive stop-band. In a waffle-iron filter the series inductances are formed by the grooves which cannot be deepened very far without sacrificing the stop-band width. Thus, a waffle-iron filter becomes a relatively low-impedance structure, and step-transformers are usually required for matching at the ends. Since the impedance level can be kept in these filters with sacrificing stop-band performance, it becomes possible to maintain relatively large spacings between all of the metallic parts so that the voltage gradients will be relatively small for given amount of power being transmitted. Hense, the power-handling ability should be relatively large.

It is therefore an object of this invention to provide a novel waveguide filter structure.

It is another object to provide a waveguide structure that is an effective low-pass, high-power filter.

It is still another object to provide a leaky wall waveguide filter structure that is free of beam effect.

It is yet another object to provide a stop-band filter that does not have additional stop bands at higher frequencies.

BRIEF DESCRIPTION OF THE DRAWINGS

The above-mentioned and other advantages, features and objects of the invention will become more apparent from the following description taken in connection with the illustrative embodiments and the accompanying drawings, wherein:

FIG. 1 shows front elevation view of an embodiment of the invention partially in cross section;

FIG. 2 is an end view of FIG. 1;

FIG. 3 is a segmentary cross section of FIG. 1 taken at 3—3;

FIG. 4 is a fragmentary front elevational view of a second embodiment of the invention which uses vertical septums to divide the waveguide into channels;

FIG. 5 is a fragmentary right end view of FIG. 4 taken in 5—5; and

FIG. 6 is a cross section of FIG. 4 taken at 6—6.

DESCRIPTION OF THE PREFERRED EMBODIMENTS

Referring to FIG. 1 which shows a first embodiment, in the pass-band this structure operates as a conventional low-pass filter having an equivalent circuit consisting of series inductances alternating with shunt capacitances. The input guide shown at 11 is rectangular waveguide with the narrow dimension vertical. Energy entering at 11 encounters side waveguide structure 13 which is cut off at the band-pass frequency. Since a waveguide below cut-off looks like an inductance, side waveguide 13 forms the first series inductance of the low-pass filter structure. The side waveguides are formed by vertical plates 23 having rounded edges and are extended from upper and lower walls 9 and 10, respectively. Plates 23 overlap each other slightly, and this region of overlap has an effect which is predominantly equivalent to that of shunt capacitances between the vertical plates. Side waveguide 15 is also cut off at the band-pass frequency so that it also presents an equivalent effect predominantly like that of a series inductance. The energy continues through side waveguides 16–21 to the output at 25. The side waveguides are partially filled with lossy load material 27 thereby reducing the width.

A modified form of the filter is shown in FIG. 4. Instead of the reduced width waveguide of FIG. 1, there are double E-plane septums 31 and single E-plane septums 33. In alternating configuration the septums convert standard width waveguides into sets of 2 and 3 reduced width waveguide respectively which are shown in FIGS. 5 and 6. Other combinations are obviously possible. The input is at 37 and the energy travels through main guiding section 39 which has zig-zag configuration to output 41. The outer portions of the channels are filled with absorbing materials which can be graded. The use of several types of septums in the same filter has been found to help ensure high attenuation for all modes. Also, one set of the below cut-off waveguides is in line with the input waveguide and another set is in line with the output waveguide. This helps to reduce reflections at the input of the filter in the stop band.

In the band pass, the filter of FIG. 4 may be analyzed qualitatively either as an iterative structure consisting of alternating sections of series-L and shunt-C elements at the junctions.

The mode attenuation aspect of the filter of FIGS. 4-6 refers to higher-order modes in the stop-band of the filter. The filter of FIGS. 4-6, unlike that illustrated in FIGS. 1-3, is constructed in full-width waveguide, which is that zig-zag region within the filter bounded by metal walls separated by the width of a standard waveguide on two sides shown cut away in FIG. 4, and by the transverse edges of two sets of septums, one set being the narrow septums 31 and 33 of FIGS. 5 and 6 and the other set being the wider septums 35 of that figure. These two sets of septums in combination form the narrower-than-standard side waveguides; however, septums 31 and 35 are so disposed that these narrow side waveguides attenuate equally well certain even-order and odd-order modes that can exist in the zig-zag full-width waveguide in the stop band of the filter. The advantage of employing full-width waveguide in the zig-zag section is higher power capability than narrow waveguide.

The low voltage standing wave ratio property of the filter described in FIGS. 4-6 derives from the fact that the LC produce is much lower than that required to obtain a reactive-filter cut-off frequency at the lower edge of the stop band. As a consequence the image impedance of the iterative filter structure in the prescribed passband is very flat as well as approximately equal to the characteristic impedance of the feed waveguide. Attenuation in the lower portion of the stop band is dependent mainly on the attenuation (absorbing) properties of the side waveguides, rather than on a combination of attenuation by reflection and absorption. Nevertheless, the skirt attenuation is very steep.

The side waveguides, or waveguide cells, have a width equal to one-half the width of a standard waveguide and therefore absorb frequencies greater than twice the cut-off frequency of the standard waveguide.

Since these side waveguides employ no irises, but open directly into the main zig-zag waveguides which is twice their width, the coupling factors are roughly of the order of 0.25 within their propagating bands and for the appropriate mode. This coupling factor of 0.25 consists of the product of two factors, approximately 0.5 for the 2 to 1 ratio of waveguide widths and 0.5 for the fact that energy absorbed by the side waveguide can arrive from two directions in the zig-zag region (forward and reverse).

This filter has a stop band that is free of spurious pass bands. It has a low voltage standing wave ratio and a total insertion loss (which is the mismatch loss due to reflected power plus dissipation loss) is generally lower than 0.4 db. The greatest component of the insertion loss is the dissipation loss which can be reduced by the substitution of copper for the customary aluminum, and by using welded or brazed joints in place of pressure contact joints.

Although the invention has been described with reference to particular embodiments, it will be understood to those skilled in the art that the invention is capable of a variety of alternative embodiments within the spirit and scope of the appended claims.

What we claim is:
1. A leaky-wall waveguide filter comprising:
 (a) an input waveguide;
 (b) an output waveguide;
 (c) a first series of horizontal plates forming a series of channels with the plates alternating in length forming a zig-zag pattern;
 (d) a second series of horizontal plates forming a series of channels with the plates alternating in length forming a zig-zag pattern and being spaced from the second series of horizontal plates to form a zig-zag path from the input waveguide to the output waveguide;
 (e) vertical septums dividing the channels;
 (f) and lossy-load material partially filling the channels at the outer portions.
2. A leaky-wall waveguide filter according to claim 1 wherein the vertical septums are single and double arranged in alternate relationship.

References Cited

UNITED STATES PATENTS

| 3,187,277 | 6/1965 | Wantuch. |
| 3,237,134 | 2/1966 | Price. |
| 2,888,595 | 5/1959 | Warnecke _____ 315—3.5 |
| 3,428,922 | 2/1969 | Matthei. |
| 3,464,035 | 8/1969 | Van Kol. |

HERMAN KARL SAALBACH, Primary Examiner

C. BARAFF, Assistant Examiner

U.S. Cl. X.R.

333—81, 90